United States Patent Office 3,004,975
Patented Oct. 17, 1961

3,004,975
HYDROGENATED BENZ-INDOLES AND PROCESS FOR THEIR MANUFACTURE
Cyril Grob and Ernst Renk, Basel, Switzerland, assignors to Ciba Pharmaceutical Products Inc., Summit, N.J.
No Drawing. Filed July 13, 1959, Ser. No. 826,457
Claims priority, application Switzerland July 2, 1957
16 Claims. (Cl. 260—285.5)

This is a continuation in part of our copending application Serial No. 745,297, filed June 30, 1958, now abandoned.

This invention concerns the manufacture of hydrogenated benz-(cd)-indoles or their tautomers having the nucleus of the formula

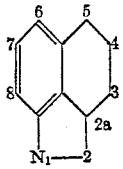

from the corresponding 2-oxo-compounds, namely 8-amino-1:2:3:4 - tetrahydro-naphthalene-1-carboxylic acid lactams having the nucleus of the formula

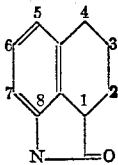

The conversion of the 2-oxo-compounds into indoles unsubstituted in the 2-position is an important step in the synthesis of a number of natural substances, especially lysergic acid. However, it has involved considerable difficulty.

It is known (see F. C. Uhle & Jakobs, J. Organ. Chem. 10 (1945) 76; A. Soll et l. Helv. 33 (1950) 67), to convert benz-(cd)-oxindoles into the corresponding benzindoles by reduction with alkali metal in the presence of an alcohol, for example, sodium in butanol, or with lithium-aluminum hydride. However, this process gives poor yields.

Attempts have been made to make the indoles by way of the 2-thioindole compounds, which can be obtained, for example, by the reaction of the oxindoles with phosphorus pentasulfide, namely, by the method of electrolytic reduction described by Kindler (Liebigs Ann. 431 (1923) 187; Arch. Pharm. 265 (1927) 389) or by desulfurisation by means of Raney nickel (Kornfeld, J. Org. Chem. 16 (1949) 131); Tagmann et al. Helv. 37 (1954) 185). However both methods are unsatisfactory.

The present invention is based on the observation that 8-amino - 1:2:3:4 - tetrahydro-naphthalene-1-carboxylic acid lactams can be converted in a simple manner and in good yield into benzindoles or the tautomers thereof by contacting an 8-amino-1:2:4-tetrahydro-naphthalene-1-carboxylic acid lactam which contains in the 1-position an acetalized aldehyde group, first with a basic agent and then with an acid agent accompanied by the splitting off of carbon dioxide. The aldehyde group in the 1-position is acetalized with lower alkanols or lower alkylene diols. The starting materials, namely the 8-amino-1:2:3:4-tetrahydro-naphthalene-1-carboxylic acid lactams containing in the 1-position an acetalized aldehyde group, may be further substituted especially in the 3:4-position, in any manner, for example, by free or functionally converted hydroxyl, oxo or carboxyl groups, such as alcoholic or phenolic hydroxyl groups, and are therefore esters or ethers, such as acetates, benzoic acid esters, para-toluene sulfonic acid esters, methyl ethers, allyl ethers, acetal, mercaptal, ketal or thioketal compounds, oximes, semicarbazones, amines, nitriles or imides. As substituents there may be mentioned free or substituted amino groups such as methylamino, ethylamino, dimethylamino, pyrrolidino, piperidino, piperazino or morpholino groups, halogen atoms, or aliphatic, aromatic or araliphatic hydrocarbon radicals which may be substituted, such as alkyl alkenyl, aralkyl, aryl or cycloalkylene groups, for example, methyl, ethyl, propyl, methylene, ethylene, propylene, propinyl, acryl, allyl, propinyl, ethinyl, cyclohexyl, cyclopentyl, benzyl, phenyl, carbomethoxypropyl, carbomethoxyethinyl and carbomethoxyethenyl groups.

The starting materials may preferably be substituted at the nitrogen atom in the 8-position by an acyl radical e.g. a lower aliphatic carboxylic or lower aromatic carboxylic acid radical, especially a lower fatty acid radical such as an acetyl group.

The conversion of the 8-amino-1:2:3:4-tetrahydro-naphthalene-1-carboxylic acid lactams into benzindoles is greatly facilitated if the nitrogen atom in the 8-position is acylated, the acyl group enhancing the opening reaction of the lactam ring.

As basic agents there are used those capable of splitting a lactam ring, such as oxides or hydroxides of alkali metals or alkaline earth metals, alkali carbonates, quaternary ammonium bases or basic ion-exchangers.

As acidic reagents there may be used inorganic or strong organic acids, such as mineral acids or organic sulfonic acids especially hydrochloric acid or benzenesulfonic acid. The contacting with the basic agent may be carried out in an aqueous, organic-aqueous or wholly organic solution. Advantageously the treatment is carried out in aqueous or aqueous-alcoholic solution.

The contacting with the acid agent is preferably also carried out in aqueous or alcoholic-aqueous solution with the exclusion of oxygen and at a raised temperature, for example, by heating the solution.

The contact of the 8-amino-1:2:3:4-tetrahydro-naphthalene-1-carboxylic acid lactams substituted in the 1-position, for example, by the diethoxy-methyl group, with a basic agent causes the lactam bond to split up with the formation of an amino-carboxylic acid, which still contains the diethoxymethyl group bound to the carbon atom to which the carboxy group is bound. The acetal group in the 1-position can be hydrolysed by a mild acid treatment to form an α-formyl-carboxylic acid which under these conditions is converted by decarboxylation, ring closure and the elimination of water into the indole derivative.

These reactions may be illustrated by the following specific example:

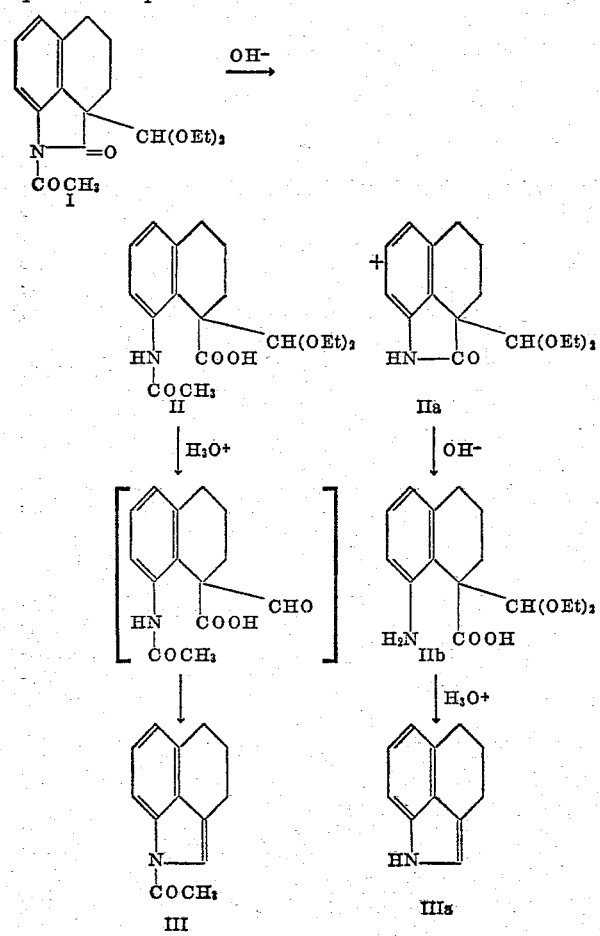

Lactam IIa which has not at first been split up by the reaction, can be converted by subsequent treatment with a basic agent into the amino-acid acetalized in the 1-position (IIb).

By contacting N - acetyl - 1 - diethoxymethyl-8-amino-1:2:3:4-tetrahydro-naphthalene-1-carboxylic acid lactam (I) with an aqueous solution of caustic soda, there is obtained even at room temperature a mixture of up to 64% of product (II) resulting from the splitting of the ring and up to 31% of the lactam (IIa).

N-acylated compounds of the type I can easily be converted into the N-unsubstituted compounds of the type IIa, for example, by heating them for a short time in a solution rendered alkaline with sodium carbonate.

When there are used as starting materials 8-amino-1:2:3:4-tetrahydro-naphthalene-1-carboxylic acid lactams containing in the 1-position an acetalized aldehyde group with a further oxo group in the 3-position, the resulting benzindole rearranges to its tautomeric benz-(cd)-indoline compound VII since the fused-on ring enters the aromatic system due to the shifting of the double bonds. These reactions may be illustrated by the following specific example, starting with N-acetyl-1-diethoxymethyl-3 - oxo - 8 - amino - 1:2:3:4-tetrahydro - naphthalene-1-carboxylic acid lactam (IV)

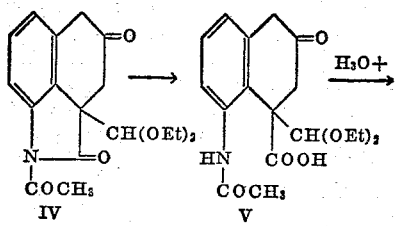

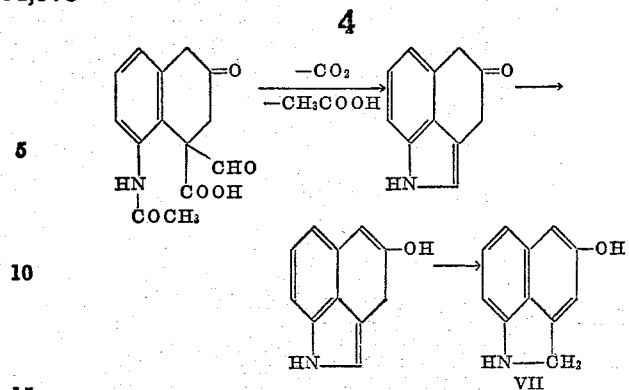

The starting materials, namely 8-amino-1:2:3:4-tetrahydro-naphthalene-1-carboxylic acid lactams which contain in the 1-position an acetalized aldehyde group are new, and form also an object of this invention. They can be obtained, for example, by reacting an 8-amino-1:2:3:4-tetrahydro-naphthalene-1-carboxylic acid lactam with an ortho-formic acid ester and acetic anhydride. Instead of ortho-formic acid esters and acetic anhydride there may be used, if desired, the diethoxymethyl acetate obtainable therefrom. The reaction is especially smooth, when compounds acylated at the nitrogen atom in the 8-position, and especially acetylated compounds, are used. Thus, for example, by reacting N-acetyl-8-amino-1:2:3:4-tetrahydro-naphthalene-1-carboxylic acid lactam or N - acetyl - 3 - oxo - 8 - amino - 1:2:3:4 - tetrahydronaphthalene-1-carboxylic acid lactam with ortho-formic acid esters and acetic anhydride the corresponding 1-diethoxymethyl compounds I and IV, respectively, are obtained.

The starting material used to produce a mixture of dihydrolysergic acid IX, namely 3'-amino-1-methyl-3-carbethoxy - 7 - diethoxymethyl - 1:2:3:4:4a:7:8:8a - octahydro-5:6-benzquinoline-7-carboxylic acid lactam (VIII), can be obtained e.g. by reacting bromomethyl-acrylic acid ethyl ester with methylamine and the product thus obtained in turn with the N-acylated or N-unsubstituted 1 - diethoxymethyl - 3 - oxo - 8 - amino - 1:2:3:4 - tetrahydronaphthalene-1-carboxylic acid lactam (IV or Va). The product thus obtained, namely 3'-amino-1-methyl-3-carbethoxy - 7 - diethoxymethyl - 1:2:3:4:7:8 - hexahydro-5:6-benzquinoline-7-carboxylic acid lactam (X) yields on hydrogenation over a catalyst the desired compound VIII. The reaction sequence is illustrated by the following chart of formulae:

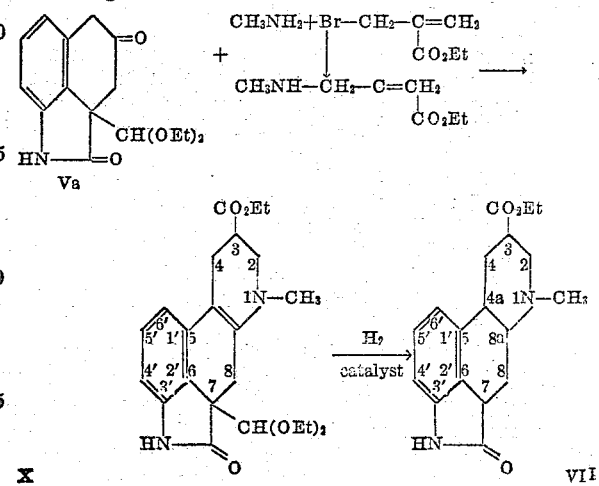

The following examples illustrate the invention:

EXAMPLE 1

*Conversion of N-acetyl-1-diethoxymethyl-8-amino-1:2:3:4-tetrahydro-naphthalene-1-carboxylic acid lactam (I) into 1:3:4:5-tetrahydro-benz-(cd)-indole (IIIa)*

(a) 9.1 grams of N-acetyl-1-diethoxymethyl-8-amino-

1:2:3:4-tetrahydro-naphthalene-1-carboxylic acid lactam of the formula

I

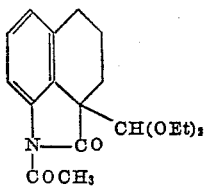

are boiled under reflux for 15 minutes in 20 ml. of ethanol and 20 ml. of a 2 N-aqueous solution of caustic soda, and the solution is then cooled and concentrated in vacuo to remove the ethanol. After the addition of 10 ml. of water the mixture is cooled in ice for 15 minutes, and the precipitated crystals are filtered off, washed with cold water and dried, whereby 5.0 grams (63.5%) of 1-diethoxymethyl-8-amino-1:2:3:4-tetrahydro-naphthalene-1-carboxylic acid lactam of the formula IIa

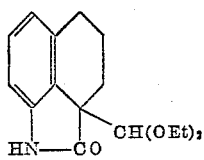

are obtained in the form of colorless crystals melting at 136–143° C. This product is sufficiently pure for the succeeding reaction. By recrystallization from methanol colorless crystals melting at 141–143° C. can be obtained.

By acidifying the alkaline filtrate with concentrated hydrochloric acid 8-acetylamino-1-diethoxymethyl-1:2:3:4-tetrahydro-1-naphthoic acid of the formula

II

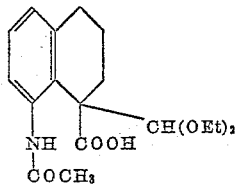

is precipitated in crystalline form, the precipitation being complete after allowing the mixture to stand at 0° C. By filtering off the precipitate, and washing it well with water and drying it there are obtained 3.0 grams (31%) of the above product II in the form of colorless crystals melting at 135–142° C., which are subjected to the following reactions. By crystallization from ethyl acetate product II can be obtained in the form of colorless lance-shaped needles melting at 145–147° C.

(b) 2.0 grams of the acid II are boiled under reflux for 45 minutes with 12 ml. of ethanol, 4 ml. of water and 4 drops of concentrated hydrochloric acid under nitrogen. After neutralization with a 2 N-aqueous solution of caustic soda and the addition of 12 ml. of a 2 N-aqueous solution of sodium carbonate, the whole is heated for a further 1½ hours on the steam bath under nitrogen, the ethanol is evaporated under atmospheric pressure, and the oil that separates is extracted with ether. Upon washing the ethereal solution neutral colorless crystals separate out, and the latter are filtered off (105 milligrams melting at about 180–192° C.). By distilling off the ether there is obtained 0.63 gram of a red oil, to which a hot solution of 0.70 gram of picric acid in 10 ml. of isopropanol is added. From the cooled solution a total of 1.24 grams (54%) of the picrate of 1:3:4:5-tetrahydro-benz-(cd)-indole of the formula IIIa

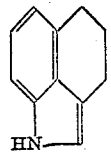

can be obtained.

After cautiously neutralizing the acid solution with a 2 N-aqueous solution of caustic soda the ethanol is removed, and the N-acetyl-tetrahydrobenz-(cd)-indole is obtained in the form of a red oil. The latter is taken up in ether, and the ethereal solution is washed with water, dried over sodium sulfate and evaporated. There are obtained 1.50 grams of a red oil.

A hot solution of 0.70 gram of picric acid in 12 ml. of isopropanol is added to 0.75 gram of the aforesaid oil, whereby there is isolated from the cooled solution a total of 0.82 gram (64%) of the picrate of N-acetyl-1:3:4:5-tetrahydrobenz-(cd)-indole of the formula

III

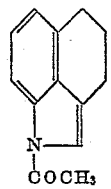

By repeated recrystallization from isopropanol the product is obtained in the form of orange-brown long needles melting at 102–104° C.

(c) 1.0 gram of the lactam IIa, 2.5 grams of caustic potash, 5 ml. of water and 5 ml. of ethanol are boiled under reflux for 24 hours, during which progressive demixing occurs. The cooled solution is acidified with concentrated hydrochloric acid to a pH value of 4.5, and after the addition of 5 ml. of ethanol, the whole is boiled under reflux for 30 minutes. Any precipitate present is filtered off and washed with ethanol, and then the solution is freed from ethanol under atmospheric pressure.

The red oil which precipitates is taken up in ether, and the ethereal solution is washed with water, dried, and evaporated. The red oil which remains behind (0.65 gram) is mixed with a hot solution of 0.70 gram of picric acid in 10 ml. of isopropanol, whereupon in the cold 0.93 gram (66.5%) of the picrate of 1:3:4:5-tetrahydrobenz-(cd)-indole IIIa crystallizes out in the form of dark brown needles melting at 159–163° C. Repeated recrystallization from isopropanol raises the melting point of the product to 162–165° C.

The picrate can be decomposed in benzene on Alox or with a 2 N-solution of caustic soda-whereby product IIIa is obtained, in the form of colorless crystals melting at 54–56° C. after the recrystallization from pentane.

The starting material I may be prepared as follows:
(a) 6.0 grams of N-acetyl-8-amino-1:2:3:4-tetrahydronaphthalene-1-carboxylic acid lactam, 8.4 grams of orthoformic acid ethyl ester and 0.20 grams of acetic anhydride are boiled for 45 minutes under reflux. After evaporating the mixture in vacuo, the residue is evaporated twice with benzene and the crystalline residue is recrystallized from isopropanol, whereby 6.9 grams (77.5%) of product of the Formula I are obtained in the form of colorless lustrous needles melting at 124–126° C.

(b) 0.50 gram of 8-amino-1:2:3:4-tetrahydro-naphthalene-1-carboxylic acid lactam, 1.7 grams of orthoformic acid ethyl ester and 1.5 grams of acetic anhydride are boiled for 5 hours under reflux, then the solution is evaporated in vacuo, and the residue is evaporated twice with benzene. Recrystallization from isopropanol yields 0.41 gram (45%) of product of the Formula I in the form of colorless lustrous needles melting at 119–125° C. The oil in the mother liquor cannot be crystallized.

EXAMPLE 2

Conversion of N-acetyl-1-diethoxymethyl-3-oxo-8-amino-1:2:3:4-tetrahydro-naphthalene-1-carboxylic acid lactam (IV) into N-acetyl-5-acetoxy-benz-(cd) indoline (VI).

(a) 6.0 grams of N-acetyl-1-diethoxymethyl-3-oxo-8- amino-1:2:3:4-tetrahydro-naphthalene-1-carboxylic acid lactam of the formula

IV
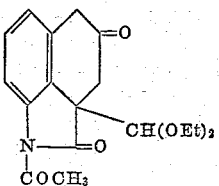

(melting at 103–138° C.) are heated with 20 ml. of a 1.0N-solution of caustic soda at 90° C. for 5 minutes under nitrogen, whereby dissolution occurs with a transient red coloration. By cooling the mixture to 0° C., 0.5 gram of 1-diethoxymethyl-3-oxo-8-amino-1:2:3:4-tetrahydro-naphthalene-1-carboxylic acid lactam of the formula Va
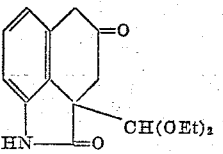

precipitates out. The filtrate is acidified with 2 N-hydrochloric acid, and the precipitated acid of the formula V
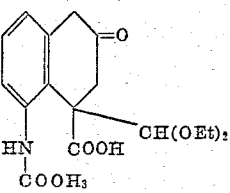

is filtered off rapidly and washed with water. After drying, there are obtained 5.4 grams of crude product V melting at 182–184° C. Recrystallization from acetone yields an analytically pure product V in the form of needles melting at 183–185° C. with decomposition. Its oxime forms colorless crystals melting at 174–176° C. (with decomposition); its paranitrophenyl-hydrazone forms yellow needles melting at 160–165° C.; and its 2:4-dinitrophenyl-hydrazone forms orange needles melting at 217–219° C.

Accordingly, by the reaction of product IV with one equivalent of an aqueous solution of caustic soda there are obtained, with the opening of the ring, 85% of acid V and by splitting off the acetyl group under nitrogen the lactam Va.

The lactam Va can also be obtained as follows:

130 ml. of ethanol of 95% strength saturated with ammonia are added at 0° C. to 10.0 grams of product IV melting at 107–140° C., whereby a clear solution is obtained after agitation for about 10 minutes. After allowing the whole to stand at 20° C., it is cooled to —15° C. and the colorless crystals which separate out (3.2 grams) are filtered off. By concentrating the filtrate in vacuo and cooling, a further 2.7 grams of product Va, i.e. a total of 5.9 grams, melting at 192–194° C. are obtained. By recrystallization from a mixture of acetone and pentane an analytically pure product melting at 194–196° C. is obtained.

The keto-acid V forms carbonyl derivatives (oxime, para-nitrophenyl-hydrazone, 2:4-dinitrophenyl-hydrazone), but these derivatives can be purified only with difficulty due to the reactivity of compound V towards acids. By allowing compound V to stand or more rapidly by heating it for a short time with an acid a blue-green, non-crystallizing oil is obtained, which very probably comprises derivatives of benz-indoline.

(b) 0.40 grams of product V, 3.0 ml. of concentrated hydrochloric acid and 3.0 ml. of glacial acetic acid are heated for one hour under nitrogen on a steam bath. The almost black solution is evaporated in vacuo, the residue is evaporated twice with benzene, and after the addition of 2.0 ml. of acetic anhydride and 1.5 ml. of pyridine, the whole is allowed to stand for 2 hours at about 20° C. It is then evaporated in vacuo, the residue is taken up in ether and washed with 2 N-hydrochloric acid and 2 N-potassium bicarbonate, dried over sodium sulfate, and evaporated.

The crystals formed after the addition of a few drops of acetone are sublimed at 160–180° C. under 0.01 mm. Hg pressure, and then yield from isopropanol 250 mg. of N-acetyl-4-acetoxy-benz-(cd)-indoline of the formula VI
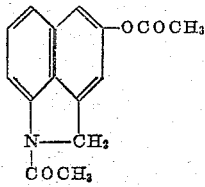

in the form of fine colorless needles melting at 124–126° C.

The ultraviolet spectrum of product VI in ethanol shows maxima at λ max. 230 and 312 mμ, log ε 4.54 and 4.05, which agree well with other benz-(cd) indoline derivatives.

The starting material IV may be prepared as follows:

(a) 20.0 grams of N-acetyl-3-oxo-8-amino-1:2:3:4-tetrahydro-naphthalene-1-carboxylic acid lactam, 24.0 grams of ortho-formic acid ethyl ester and 32 grams of acetic anhydride are heated in an oil bath at 150–160° C. When a clear solution is formed, it is evaporated in vacuo and the last traces of solvent are removed by evaporating the residue twice with benzene. The crystalline residue, after being recrystallized from ethanol yields 24.0 grams of product of the Formula IV melting at 105–140° C.

This material is sufficiently pure for the further reactions. By further recrystallization an analytically pure product melting at 140–143° C. is obtained.

(b) 1.5 grams of 3-oxo-8-amino-1:2:3:4-tetrahydro-naphthalene-1-carboxylic acid lactam, 1.2 grams of ortho-formic acid ethyl ester, 2.5 grams of acetic anhydride and 5 ml. of absolute dioxane are boiled under reflux at a bath temperature of 150–160° C., dissolution taking place after 2 hours. The solution is then boiled under reflux for a further 2 hours, the red-brown solution is evaporated in vacuo, and the residue is recrystallized from methanol. There are obtained 1.2 grams of colorless crystals melting at 103–135° C.

(c) The treatment of 3-oxo-8-acetylamino-tetrahydro-1-naphthoic acid as described under (a) yields products of the Formula IV directly, the heating period being increased to about 30 minutes.

EXAMPLE 3

Conversion of 3'-amino-1-methyl-3-carbethoxy-7-diethoxy-methyl-1:2:3:4:4a:7:8:8a-octahydro-5:6-benzquinoline-7-carboxylic acid lactam (VIII) into a mixture of the stereoisomers of dihydro-lysergic acid.

500 mg. of 3'-amino-1-methyl-3-carbethoxy-7-diethoxymethyl-1:2:3:4:4a:7:8:8a-octahydro-5:6-benzquinoline-7-carboxylic acid lactam (VIII) of the formula

VIII are refluxed with 10 ml. of 25% potassium hydroxide for 23 hours. The solution is then cooled and acidified with concentrated hydrochloric acid until a pH of 3 is reached.

After dilution with a small amount of water, the silicic acid deposited is filtered off and the clear filtrate is heated on a steam bath. After 3 minutes, crystals begin to separate as colorless rhombic leaflets. After 20 minutes the mixture is cooled and filtered. There is obtained 210 mg. of a mixture of the stereoisomers of dihydrolysergic acid hydrochloride IX of the formula

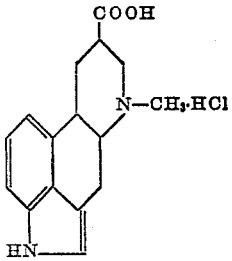

IX which melts above 300° C. (dec.).

These crystals show exactly the same kind of color as dihydrolysergic acid in the test according to Keller-Kiliani. By dissolution in water containing a small amount of ammonia and careful evaporation of the solvent, the free amino-carboxylic acid separates in crystalline form.

The starting material VIII used may be prepared as follows:

(a) *Prepared from lactam Va.*—A solution of 1.60 grams of bromomethyl-acrylic acid ethyl ester in 20 ml. of absolute ethanol is allowed to stand for 15 minutes at room temperature with 3.5 ml. of an ethanolic solution of 20% strength of methylamine, while cooling the mixture with water, then 2.00 grams of lactam Va and 5 ml. of absolute ethanol are added, and the whole is boiled under reflux for 4½ hours. The bright yellow solution is evaporated in vacuo, and the residue is distributed between ethyl acetate and 2 N-hydrochloric acid. The ester solution is again extracted twice with 2 N-hydrochloric acid, washed neutral, dried and evaporated. From the residue (40 mg.) which contains crystals a further small amount of lactam Va can be recovered by means of ethyl acetate.

The hydrochloric acid extract is immediately rendered alkaline to phenolphthalein with a 2 N-solution of caustic soda, and the precipitated oil (sometimes crystals) is taken up in ethyl acetate, and the ester solution is washed neutral, dried and evaporated. Crystallization of the residue from isopropanol yields 1.36 grams of 3'-amino-1-methyl-3-carbethoxy - 7 - diethoxymethyl - 1:2:3:4:7:8-hexahydro-5:6-benzquinoline - 7 - carboxylic acid lactam (X) of the formula

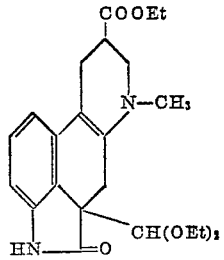

X which melts at 175–180° C. Recrystallization from isopropanol or ethyl acetate yields pale yellow needles which melt at 181–184° C.

500 mg. of this compound are dissolved in a mixture of 5 ml. of water and 3 ml. of 2 N-hydrochloric acid and, after the addition of 50 mg. Adam's catalyst, hydrogenated at room temperature. After the uptake of 1 mol of hydrogen, hydrogenation ceases. The mixture is filtered and the filtrate is evaporated to dryness. The residue is treated with 3.5 ml. of 2 N-caustic soda in the cold and extracted with ethyl acetate. The extract is washed once with water, dried over sodium sulfate and the solvent is then evaporated. The residue crystallizes from isopropanol and there are obtained 475 mg. of 3'-amino-1-methyl-3-carbethoxy-7-diethoxymethyl-1:2:3:4:4a:7:8:8a - octahydro-5:6-benzquinoline-7-carboxylic acid lactam of the formula

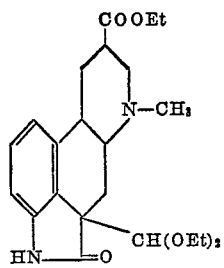

VIII as colorless needles which melt at 156–181° C. Recrystallization from isopropanol brings the melting point to 163–165°.

By treating this compound with methyliodide in acetone, a methoiodide is obtained, melting at 202° (dec.) after being recrystallized from isopropanol.

(b) *Prepared from N-acetyl-lactam IV.*—A solution of 22 grams of bromomethyl-acrylic acid ethyl ester in 30 ml. of absolute ethanol is allowed to stand for 20 minutes at room temperature with 4.0 ml. of an ethanolic solution of 20% strength of methylamine, then 1.65 ml. of the same methylamine solution, 3.00 grams of N-acetyl-lactam IV and 15 ml. of absolute ethanol are added, and the whole is boiled under reflux for 5 hours. The reaction mixture is evaporated in vacuo, the residue is distributed between ethyl acetate and 2 N-hydrochloric acid, the ester solution is again extracted twice with 2 N-hydrochloric acid, washed neutral, dried and evaporated. The residue consists of 350 milligrams of an oil containing crystals, and from which are isolated by recrystallization from isopropanol colorless lamellae melting at 205–207° C.

The hydrochloric acid extract is immediately rendered alkaline to phenolphthalein by the addition of a 2 N-solution of caustic soda, and the precipitated crystals are filtered off. The latter, after recrystallization from isopropanol, yield 1.56 grams of 3'-amino-1-methyl-3-carbethoxy-7-diethoxymethyl-1:2:3:4:7:8 - hexahydro - 5:6-benzquinoline-7-carboxylic acid lactam (X) which may be converted into the desired starting material according to the directions given above.

What is claimed is:

1. A process for the manufacture of benz-(cd)-indoles which consists of contacting a 1-X-8-amino-1:2:3:4-tetrahydro-naphthalene-1-carboxylic acid lactam, in which X stands for a member selected from the group consisting di-lower alkoxy-methyl and lower alkenylenedioxy-methyl, (a) with a basic agent selected from the group consisting of oxide sand hydroxides of alkali metals and alkaline earth metals, alkali carbonates, quaternary ammonium bases and basic ion-exchangers, and (b) with an acidic reagent selected from the group consisting of organic sulfonic acids and mineral acids, whereby carbon dioxide is split off.

2. A process for the manufacture of benz-(cd)-indoles which consists of contacting a 1-X-8-amino-1:2:3:4-tetrahydro-naphthalene-1-carboxylic acid lactam, in which X stands for a member selected from the group consisting of di-lower alkoxy-methyl and lower alkylenedioxy-methyl, (a) with an alkali hydroxide and (b) with a mineral acid, whereby carbon dioxide is split off.

3. A process for the manufacture of benz-(cd)-indoles which consists of contacting a 1-X-8-amino-1:2:3:4-tetrahydro-naphthalene-1-carboxylic acid lactam, in which X stands for a member selected from the group consisting of di-lower alkoxy-methyl and lower alkylenedioxy-methyl, (a) with an alkali hydroxide and (b) with dilute hydrochloric acid, whereby carbon dioxide is split off.

4. A process for the manufacture of benz-(cd)-indoles which consists of contacting a 1-X-8-N-acyl-amino-1:2:3:4-tetrahydro-naphthalene-1-carboxylic acid lactam, in which acyl represents lower fatty acid acyl radical, and in which X stands for a member selected from the group consisting of di-lower alkoxy-methyl and lower alkylenedioxy-methyl, (a) with a basic agent selected from the group consisting of oxides and hydroxides of alkali metals and alkaline earth metals, alkalicarbonate, quaternary ammonium bases and basic ion-exchangers, and (b) with an acidic reagent, selected from the group consisting of organic sulfonic acids and mineral acids, whereby carbon dioxide is split off.

5. A process for the manufacture of benz-(cd)-indoles which consists of contacting a 1-X-8-N-acyl-amino-1:2:3:4-tetrahydro-naphthalene-1-carboxylic acid lactam, in which acyl represents lower fatty acid acyl radical, and in which X stands for a member selected from the group consisting of di-lower alkoxy-methyl and lower alkylenedioxy-methyl, and which is oxygenated in position 3, (a) with a basic agent selected from the group consisting of oxides and hydroxides of alkali metals and alkaline earth metals, alkali carbonates, quaternary ammonium bases and basic ion-exchangers, and (b) with an acidic reagent, selected from the group consisting of organic sulfonic acids and mineral acids, whereby carbon dioxide is split off.

6. A process for the manufacture of benz-(cd)-indoles which consists of contacting a 7-X-3'-amino-1-alkyl-3-carbalkoxy-1:2:3:4:4a:7:8:8a-octahydro-5:6-benzquinoline-7-carboxylic acid lactam, in which X stands for a member selected from the group consisting of di-lower alkoxy-methyl and lower alkylenedioxy-methyl, (a) with a basic agent selected from the group consisting of oxides and hydroxides of alkali metals and alkaline earth metals, alkali carbonates, quaternary ammonium bases and basic ion-exchangers, and (b) with an acidic reagent, selected from the group consisting of organic sulfonic acids and mineral acids, whereby carbon dioxide is split off.

7. 1-X-8-amino-1:2:3:4 - tetrahydro-naphthalene-1-carboxylic acid lactam, wherein X is a member selected from the group consisting of di-lower alkoxy-methyl and lower alkylenedioxy-methyl.

8. 1-diethoxymethyl-8-amino-1:2:3:4-tetrahydro-naphthalene-1-carboxylic acid lactam.

9. 1-diethoxymethyl-8 - N - acyl-amino - 1:2:3:4 - tetrahydro-naphthalene-1-carboxylic acid lactam, in which acyl represents the lower fatty acid acyl radical.

10. 1-diethoxymethyl-8-N-acetyl-amino - 1:2:3:4-tetrahydro-naphthalene-1-carboxylic acid lactam.

11. 1-diethoxymethyl-3-oxo-8-amino - 1:2:3:4 - tetrahydronaphthalene-1-carboxylic acid lactam.

12. 1-diethoxymethyl - 3 - oxo-8-N-acyl-amino-1:2:3:4-tetrahydronaphthalene-1-carboxylic acid lactam, in which acyl represents the lower fatty acid acyl radical.

13. 1-diethoxymethyl-3-oxo-8-N-acetyl-amino - 1:2:3:4-tetrahydronaphthalene-1-carboxylic acid lactam.

14. The methoiodide of 3'-amino-1-methyl-3-carbethoxy - 7 - diethoxymethyl - 1:2:3:4:4a:7:8:8a - octahydro-5:6-benzquinoline-7-carboxylic acid lactam.

15. 3'-amino-1-methyl-3-carbethoxy - 7 - diethoxymethyl-1:2:3:4:7:8-hexahydro-5:6-benzquinoline - 7 - carboxylic acid lactam.

16. 3'-amino-1-methyl-2-carbethoxy - 7 - diethoxymethyl-1:2:3:4:4a:7:8:8a-octahydro - 5:6 - benzquinoline - 7-carboxylic acid lactam.

No references cited.

UNITED STATES PATENT OFFICE
CERTIFICATE OF CORRECTION

Patent No. 3,004,975                                   October 17, 1961

Cyril Grob et al.

It is hereby certified that error appears in the above numbered patent requiring correction and that the said Letters Patent should read as corrected below.

Column 1, line 48, for "A. Soll et 1." read -- A. Stoll et al. --; column 2, line 2, for "-1:2:4-" read -- -1:2:3:4- --; line 24, after "alkyl" insert a comma; column 10, line 52, after "consisting" insert -- of --; line 55, for "oxide sand" read -- oxides and --; column 11, lines 3 and 16, after "represents", each occurrence, insert -- a --; column 12, line 29, for "-2-carbethoxy-" read -- -3-carbethoxy- --.

Signed and sealed this 3rd day of July 1962.

(SEAL)
Attest:

ERNEST W. SWIDER
Attesting Officer

DAVID L. LADD
Commissioner of Patents